United States Patent [19]

Nielsen et al.

[11] Patent Number: 5,230,059
[45] Date of Patent: Jul. 20, 1993

[54] SOFTWARE - CONFIGURABLE ADAPTIVE COMPUTER INTERFACE

[75] Inventors: David Nielsen, Carlsbad; Tom Machnik, San Marcos, both of Calif.

[73] Assignee: Kraft Systems, Inc., Vista, Calif.

[21] Appl. No.: 554,001

[22] Filed: Jul. 16, 1990

[51] Int. Cl.⁵ ............................................ G06F 3/033
[52] U.S. Cl. ................................ 395/800; 340/706;
340/709; 340/710; 364/927.92; 364/929.12;
364/926; 364/236.8; 364/237.8
[58] Field of Search .............. 364/DIG. 1, DIG. II;
340/706, 709, 710; 395/800

[56] References Cited

U.S. PATENT DOCUMENTS

| | | | |
|---|---|---|---|
| 4,156,928 | 5/1979 | Inose et al. | 364/DIG. II |
| 4,306,232 | 12/1981 | Burson | 340/706 |
| 4,490,775 | 12/1984 | Quan | 361/406 |
| 4,588,187 | 5/1986 | Dell | 273/1 E |
| 4,597,043 | 6/1986 | Pasierb | 364/DIG. I |
| 4,631,702 | 12/1986 | Korba | 364/DIG. II |
| 4,750,111 | 6/1988 | Crosby et al. | 364/200 |
| 4,824,111 | 4/1989 | Hoye | 273/148 B |
| 4,853,850 | 8/1989 | Krass et al. | 364/200 |
| 4,868,780 | 9/1989 | Stern | 364/DIG. II |

OTHER PUBLICATIONS

Korsec and Ward, "Programmable Connector", IBM Tech. Disclosure Bulletin, vol. 15, No. 3 Aug. 1972.
"Graphics Solution Operation Manual", ATI Tech. Inc. p. 17, 1987.

Primary Examiner—David Y. Eng
Attorney, Agent, or Firm—Hecker & Harriman

[57] ABSTRACT

An interface to adapt a computer to a real-time environment and that allows the adaptation procedures to be controlled using software. By allowing multiple adaptation parameters, a variety of clock rates and processor configurations can be supported. Since the parameters can be loaded by software, the difficulty of setting inconvenient and inaccessible physical configuration switches of the prior art is eliminated. Current passes through the variable resistances of the joystick potentiometers to charge capacitors. Timers measure the time required to charge the capacitors to a control voltage. This control voltage is determined by a DAC circuit which can be programmed via software. If the control voltage is lowered, the charging time is reduced.

1 Claim, 7 Drawing Sheets

SOFTWARE - CONFIGURABLE ADAPTIVE COMPUTER INTERFACE

BACKGROUND OF THE INVENTION

1. Field of the Invention

This invention relates generally to the field of computer interfaces and in particular to a software-based method for controlling a computer interface for a joystick input device.

2. Background Art

To allow computers to communicate and interact with their environment, they are often connected to external devices and signals. Frequently, these external devices and signals are asynchronous to the computer; they do not follow the internal clock of the computer. They are often referred to as real-time devices and signals. Although many computer applications require real-time interaction, one of the most common examples involves the playing of computer games. Games require input from the players, which is often accomplished through the use of joystick input devices. However, a joystick cannot be connected directly to the computer. It must be connected through an interface.

A joystick input device typically provides two analog resistance values representing orthogonal position coordinates. The analog values must be digitized before they can be processed by a digital computer. Analog-to-digital conversion is performed by an analog-to-digital (A/D) converter, which is typically implemented by generating a binary pulse according to a resistance-capacitance (RC) network. Currents through the joystick resistances charge capacitors to a specific voltage, and pulse generators produce a signal dependent upon the time required to reach this voltage. Because software measures the binary in time units pulse dependent on the main clock oscillator in the computer, the analog joystick measurements are dependent upon the processing speed of the computer. As described below, this dependency prevents the joysticks from operating properly with improved computers that have higher clock rates.

In the prior art, a single constant is sometimes used to relate the timing of external events measured in internal clock cycles to standardized units of time. Since computers in which this method is utilized are typically based on a highly stable quartz crystal oscillator, operating at a single frequency for all models of the particular computer, a single constant could adequately relate the internal and external timings.

Another method used in the prior art to relate the timing of external events to the processor clock speed is to add an additional oscillator which operates at a frequency more easily relatable to standard time units. A real-time clock oscillator of this type typically measures the external signals in standard time units, and stores the values in registers which can be read by the computer at a time determined by the main clock oscillator.

Both of these prior art methods have disadvantages. As technology has improved, new models of computers have been introduced with higher frequency oscillators and improved processor configurations. These improvements have increased the clock rates, preventing the use of a single constant to relate the internal timing with standard time units. A prior art attempt to solve this limitation implements selection of a particular constant from a range of constants via DIP switches, but the switches are inaccessible, inconvenient, and often confusing. The use of a separate real-time clock oscillator increases the cost and complexity of the system and requires synchronization circuitry to prevent timing conflicts with the main clock oscillator.

Therefore, it is an object of the present invention to provide an interface which can adapt the internal timing of computers with various clock rates and processor configurations to the real-time environment in which they operate.

It is another object of the present invention to provide a means of software control of the rate adaptation parameters.

SUMMARY OF THE PRESENT INVENTION

The present invention provides an interface to adapt a computer to a real-time environment and allows the adaptation procedures to be controlled using software. By allowing multiple adaptation parameters, a variety of clock rates and processor configurations can be supported. Since the parameters can be loaded by software, the difficulty of setting inconvenient and inaccessible physical configuration switches of the prior art is eliminated.

In the preferred embodiment of the present invention, the adaptive interface is used to couple joystick input devices to personal computers having processors with various processing speeds. The interface includes an analog-to-digital converter (ADC) circuit, a digital-to-analog converter (DAC) circuit, and decode logic.

Joystick input devices typically consist of two potentiometers, one for each axis of an X-Y coordinate system, connected to a handle which is manipulated by the user. The resistances of the potentiometers are continuously variable and are determined by the position of the handle along each axis. To be interpreted by the computer, these analog resistance values must first be converted to digital form. This conversion is accomplished by the ADC circuit.

Current passes through the variable resistances of the joystick potentiometers to charge capacitors. Pulse generators produce a binary signal dependent upon the time required to charge the capacitors to a control voltage. This control voltage is determined by the DAC circuit which, unlike prior art interfaces, can be programmed via software. If the control voltage is lowered, the charging time is reduced. Since each pulse generator produces an output pulse during the time its capacitor is charging, a reduced charging time shortens the pulse generator output pulses. Software counts the duration of the pulse generator output pulses in units of the internal clock of the computer. Since a faster computer will count to a higher value in a specific amount of time, a reduced charging time compensates for the increased speed of the computer and allows correct measurement of the joystick resistance values.

The DAC circuit is coupled to the computer I/O bus, allowing software to write and read adaptation constants to and from the DAC circuit. Since the adaptation constants can be programmed by software, a much more convenient and versatile method of adapting computers to an external environment has been provided.

DETAILED DESCRIPTION OF THE PRESENT INVENTION

An adaptive computer interface which is configurable via software is described. In the following description, numerous specific details, such as number and nature of external signals, type of computer, number of possible adaptation constants, I/O address locations, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

Computers generally operate by performing a series of discrete operations with a specific amount of time allocated to each operation. In order to schedule these operations in successive time periods, a computer includes an internal clock oscillator that generates a train of pulses, each separated by a specific amount of time. If the time between the pulses can be reduced, more pulses will occur during any given unit of time. Consequently, a computer is able to perform more operations during that given period of time.

However, since a computer requires a certain minimum amount of time to perform each operation, the number of operations a computer can perform in a given amount of time is limited. Since advancing technology is continually increasing the rate at which computers can perform these operations, the amount of time between the clock pulses is not equal for all computers. Therefore, if a computer is to communicate with the environment external to it, it must be adapted to what is called "real time." Real time is the time elapsed between events occurring external to the computer. It is absolute and is measured in units of fixed duration, such as seconds, not in units of the processing speed of the computer, which is relative and varies among computers.

Interfacing a computer to a real-time environment requires a method for relating the timing of the processing speed of the computer to the timing of external events. Although the prior art has attempted to provide solutions to this problem for computers with a single standardized system clock rate, improvements in microprocessor technology have resulted in newer models of a particular computer, (e.g., the IBM Personal Computer), with increasingly higher processing speeds.

In the early 1980's, computers usually had clock rates from 1 to 5 megahertz. Over the last decade, clock rates have increased to 10, 12, 16, 20, 25 and even to 33 megahertz. Since an interface may be connected to a computer operating at any of the above clock rates and perhaps others, the interface must be designed to operate properly in any model of the computer, regardless of the processing speed.

Figure 1:
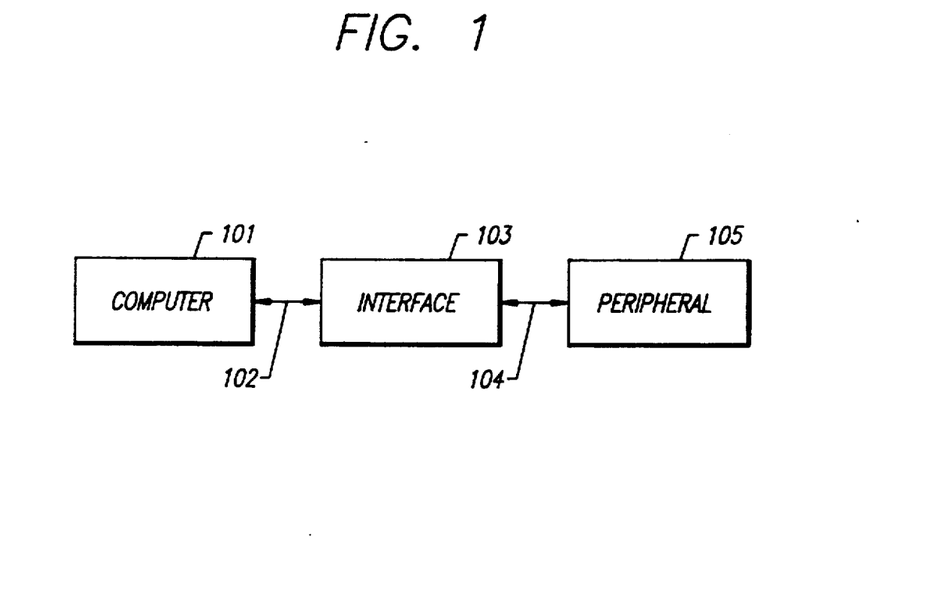
FIG. 1 is a block diagram illustrating the system in which the present invention is used.

FIG. 1 illustrates a system in which a computer 101 is coupled to one or more external devices, referred to as peripherals 105, using one or more interfaces 103. Peripherals are used to expand the capabilities of computers and to allow them to communicate and interact with their environment. Some examples of peripherals are video displays, printers, telephone modems, mouse input devices, and, in the preferred embodiment, joystick input devices.

The wide range of processing speeds over which computers operate complicates the connection of peripherals to a computer. Since a computer and its peripherals may each be operating at their own rates, the task of adapting the incompatible components to each other falls to the interface.

Prior art methods have been developed to accommodate the adaptation of computers with higher processing speeds, but these methods require manually adjusting the settings of DIP switches. The DIP switches allow the selective connection and disconnection of resistors to a voltage divider circuit in parallel with one of the resistors of a voltage divider. Since the ratio of resistances in the voltage divider circuit determines the voltage at the output of the voltage divider, connection or disconnection of resistors to or from the circuit with DIP switches allows a specific voltage to be set. This specific voltage is then applied to the control voltage terminal of an ADC circuit to adjust the operation of the ADC circuit in order to compensate for different processing speeds and processor configurations of the computer in which the interface is installed. However, since the DIP switches are mounted directly on the interface card, they are inaccessible, and it is often difficult and nonintuitive to determine the correct switch settings for a particular computer. Also, the DIP switches often occupy limited physical space, preventing use of the space to mount other components which would expand the capabilities of the interface.

Figure 6:
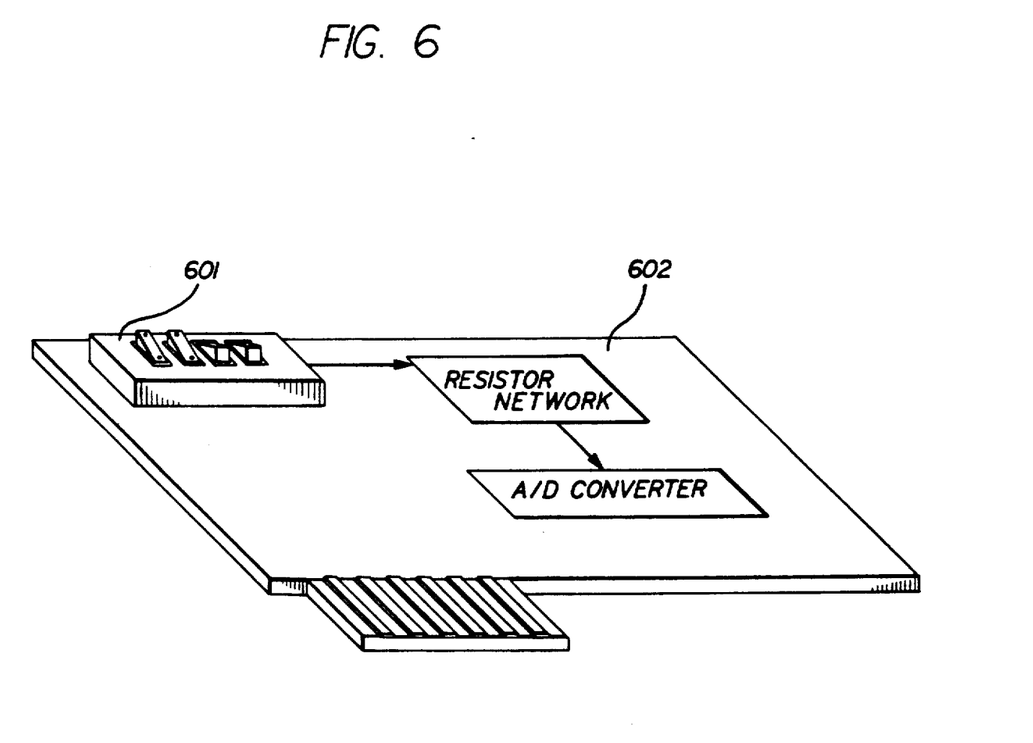
FIG. 6 is a perspective view illustrating an interface which uses the DIP switch adaptation method of the prior art.

In the prior art, which is illustrated in FIG. 6, the control voltage is programmed with DIP switches 601 mounted on an interface card 602. The DIP switches change the voltage by changing the ratio of resistances in a voltage divider circuit. Since the interface card is installed inside the computer cabinet, changing the switch settings is difficult and inconvenient. Also, the relationship between switch settings and processing speeds is not obvious to the user. The user must look up processing speeds and processor configurations on a table to find the appropriate switch settings.

To overcome these problems, the present invention allows adaptation constants to be programmed into the interface via software. Since the present invention does not require the use of DIP switches to set the adaptation constants, the inconvenience and confusion associated with the DIP switches is eliminated. Software determines and sets the proper adaptation constants automatically or semi-automatically. Alternatively, the user can manually adjust the adaptation constants using software. Also, once the appropriate adaptation constants are determined, the software automatically loads these values into the interface every time the computer is turned on. Thus, the present invention is a great improvement over the prior art DIP switch method of adapting computers to external devices and signals.

Figure 5:
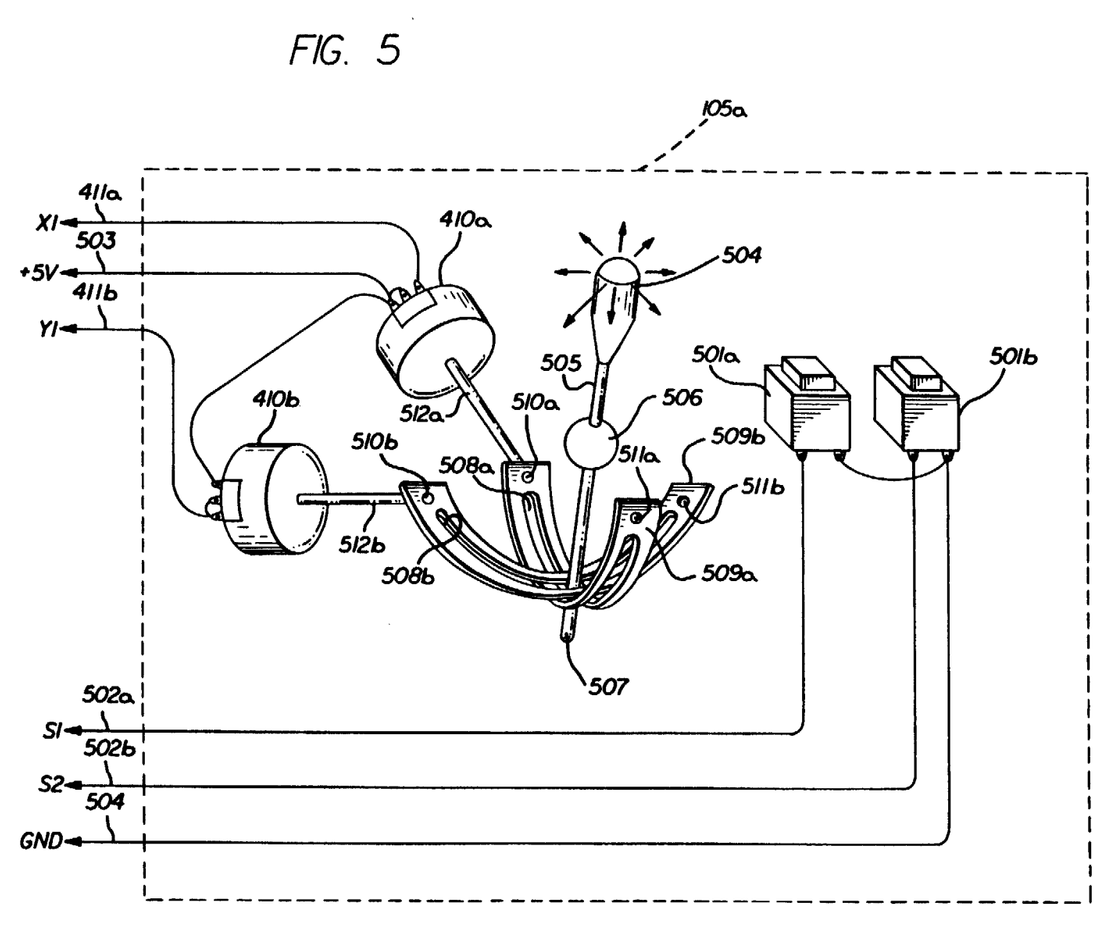
FIG. 5 is a perspective view illustrating a joystick input device.

A joystick input device, such as may be used with the present invention, is illustrated in FIG. 5. The joystick device generally comprises a shaft 505 disposed in and retained by orthogonal guides 509a and 509b. These guides are in turn coupled to shafts 512a and 512b at potentiometers 410a and 410b.

The joystick input device 105a includes handle 504 affixed to the upper end of shaft 505. Handle 504 and shaft 505 may be integrated as a single piece. The lower end of shaft 505 is coupled to ball 506. Ball 506 is set in a socket integral to a housing (not shown), allowing ball 506 to rotate freely in any direction. Shaft 507 extends approximately downward from ball 506, affixed to ball 506 at a point diametrically opposite the point where shaft 505 is affixed. Shaft 507 is collinear with shaft 505. Shafts 505 and 507 may be separate pieces or may be integrated into a single piece. Ball 506 may be a separate piece or may be integrated with either shaft 505 or shaft 507 or both into a single piece.

Shaft 507 is contained within elongated slot 508a of guide 509a and within elongated slot 508b of guide 509b at a point proximate to the distal end of shaft 507. Guides 509 a and b may be fabricated from flat strips formed into semi-circular arcs with the surfaces oriented tangentially. Guides 509 a and b are mounted perpendicularly to each other in a manner such that the points defined by the arcs of the guides at their respective centers are both located along a vertical line passing through the center of ball 506, with the points displaced from each other only slightly along this vertical line. These points are located above the point where shaft 507 passes through elongated slots 508 a and b of guides 509 a and b.

Pivot points 510a and 511a are located at the diametrically opposite ends of guide 509a. Guide 509a is free to pivot about the axis which passes through pivot points 510a, 511a and which is horizontal. Pivot points 510b and 511b are located at the diametrically opposite ends of guide 509b. Guide 509b is free to pivot about the axis which passes through pivot points 510b, 511b and which is horizontal. Shafts 512a and 512b are perpendicular to each other in a horizontal plane. Shaft 512a is collinear with axis about which guide 509a rotates, and shaft 512b is collinear with the axis about which guide 509b rotates.

One end of shaft 512a is coupled to guide 509a at pivot point 510a. The other end of shaft 512a is coupled to potentiometer 410a. One end of shaft 512b is coupled to guide 509b at pivot point 510b. The other end of shaft 512b is coupled to potentiometer 410b.

Potentiometers 410 a and b include conductive wipers that are mechanically coupled to the potentiometer shafts and which rotate with the shafts. When rotated, these wipers move along circular arcs of resistive material located within the potentiometers. Each potentiometer has three terminals. The first terminal is electrically coupled to the wiper. The second and third terminals are electrically coupled to opposite ends of the circular arc of resistive material. As the shaft is rotated from one extreme of the arc to the other in the first direction of rotation, the wiper moves from the end of the conductive material coupled to the second terminal to the end of the conductive material coupled to the third terminal. Thus, the electrical resistance between the first and second terminals increases from zero to the maximum resistance of the potentiometer, and the electrical resistance between the first and third terminals decreases from the maximum resistance of the potentiometer to zero.

The ball joint formed by ball 506 in its socket allows handle 504 and shaft 505 to be inclined from a perfectly vertical position until a certain angular limit is reached. This limit may or may not be circularly uniform. As the user manipulates handle 504 over its angular range, shafts 505, 507 pivot about ball 506, causing shaft 507 to be inclined from vertical at an equal angle, but in the opposite direction. Since shaft 507 is free to move within elongated slots 508 a and b and guides 509 a and b are free to pivot as described above, inclination of shaft 507 causes rotation of guides 509 a and b about their axes. Rotation of guides 509 a and b causes rotation of shafts 512 a and b, which changes the position of the potentiometer wipers along the conductive arcs of the potentiometers, ultimately changing the resistance of the potentiometers. Thus, the resistance of potentiometers indicates the position of the joystick handle along orthogonal axes.

Although a joystick input device with the gimbal mechanism described above, which includes ball 506, shaft 507, guides 509a, b, pivot points 510a,b and 511a,b, and shafts 512a,b, could be used with the present invention, any suitable joystick or gimbal mechanism can be used without departing from the spirit and scope of the present invention.

Also illustrated in FIG. 5, a joystick input device may include one or more pushbutton switches 501 a and b mounted on the housing. Pushbutton switches 501 a and b are "normally open" (i.e., do not provide electrical continuity), but do provide electrical continuity when depressed. Pushbutton switches 501 a and b contain springs to restore them to their normally positions after they are no longer depressed. Thus, pushbutton switches 501 a and b produce a binary outputs depending upon whether or not they are depressed.

Pushbutton switches 501 a and b are typically used in game applications as "fire" or "jump" buttons, but they may be used for other applications as well. In general, the pushbutton switches are used to input binary information into the computer. Since digital computers are based upon data and signals of a binary nature, binary outputs 502a and b from push-button switches 501a and b can be easily interfaced to the computer. However, the analog current outputs are not compatible with the digital nature of the computer and must first be digitized before they can be interpreted by the computer.

Figure 2:
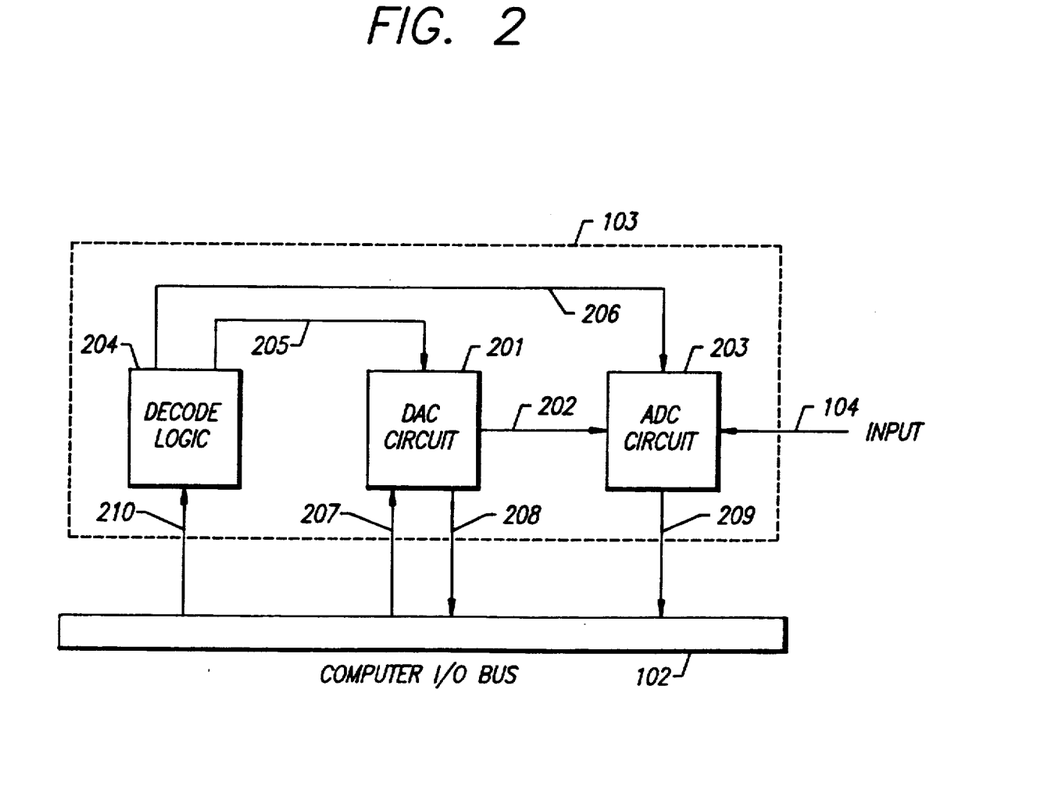
FIG. 2 is a block diagram illustrating the present invention.

A block diagram of this invention is illustrated in FIG. 2. An interface 103 produces digital signals from the analog signals from the peripherals before they are passed to the computer I/O bus 102. Since the internal clock of the computer determines when the computer is ready to accept new information from the peripherals, the interface 103 must also include circuitry to determine when the computer is ready to accept the new information and to communicate the new information to the computer at that time. This circuitry is represented by the decode logic 204. To convert the analog signals to digital form, the interface 103 uses an analog-to-digital converter (ADC) circuit 203. The ADC circuit 203 provides a digital output signal which remains in the active state for a period of time depending upon the analog input signal. The computer counts the duration of the digital output signal from the ADC 203 in units that are proportional to the processing speed of the computer.

As illustrated in FIG. 2, a block diagram of the present invention includes decode logic 204, DAC circuit 201, and ADC circuit 203. Decode logic 204 is coupled to DAC circuit 201 by coupling 205 and to ADC circuit 203 by coupling 206. DAC circuit 201 is coupled to ADC circuit 203 by coupling 202. ADC circuit 203 is coupled to peripheral 105 by coupling 104. Decode logic 204 is coupled to computer I/O bus 102 by coupling 210. DAC circuit is coupled to computer I/O bus 102 by couplings 207,208. ADC circuit 203 is coupled to computer I/O bus 102 by coupling 209.

Because of the effect of the clock rate and processor configuration on the measurements, a method must be used to compensate for this effect. One method, used both in the prior art and in the present invention, involves reducing the control voltage on the quad pulse generator for computers with higher processing speeds. The timing capacitors are charged to the reduced control voltage more quickly, which compensates for the ability of a computer with a higher processing speed to count more quickly.

Adaptation constants are used by the digital-to-analog converter (DAC) circuit 201 to set the control voltage and, thus, to determine the charging time of the capacitors. Lowering the control voltage reduces the charging time to allow adaptation to computers with higher processing speeds.

Figure 3:
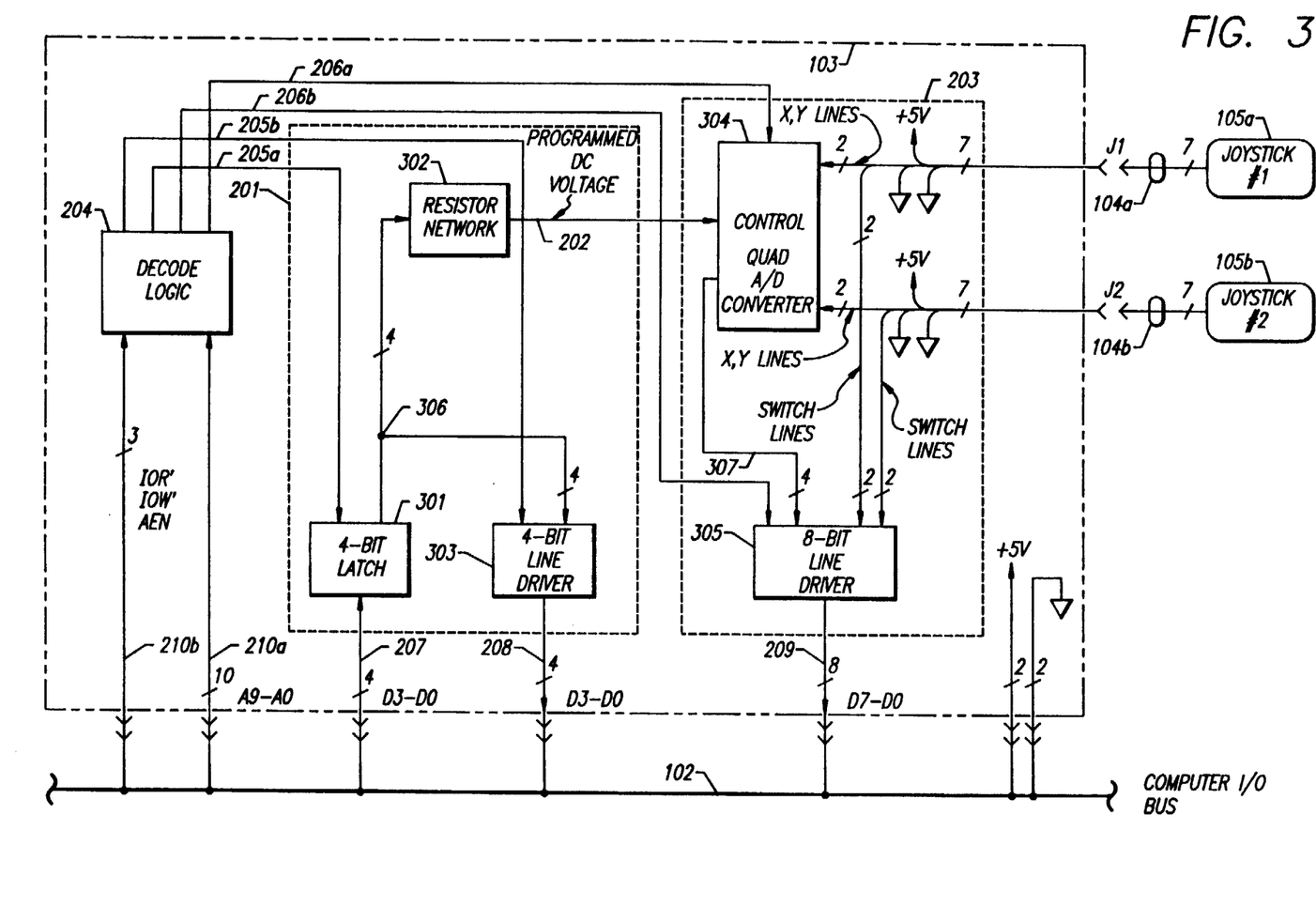
FIG. 3 is a block diagram illustrating the preferred embodiment of the present invention.

The preferred embodiment of the present invention is illustrated in detail in FIG. 3. DAC circuit 201 includes 4-bit latch 301, resistor network 302, and 4-bit line driver 303. ADC circuit 203 includes quad A/D converter 304 and 8-bit line driver 305. Although the number of bits is specified for the latch and line drivers, the present invention could be implemented with elements having different bit capacities.

Decode logic 204 is coupled to computer I/O bus 102 by address lines 210a and control lines 210b. Address lines 210a include the ten address lines A9–0. Control lines 210b include the three control lines IOR', IOW', and AEN (where apostrophe denotes active low). Although certain address and control lines are specified above, the present invention could be implemented with any suitable I/O lines or combinations of I/O lines.

Decode logic 204 is coupled to 4-bit latch 301 by enable line 205a. Decode logic 204 is coupled to 4-bit line driver 303 by enable line 205b, to quad A/D converter 304 by enable line 206a, and to 8-bit line driver 305 by enable line 206b.

Computer I/O bus 102 is coupled to 4-bit latch 301 by data path 207. Data path 207 includes the four data lines D3–D0. Computer I/O bus 102 is coupled to 4-bit line driver 303 by data path 208. Data path 208 includes the four data lines D3–D0. Four-bit latch 301 is coupled to resistor network 302 and to 4-bit line driver 303 by data path 306. Data path 306 is four bits wide. Quad A/D converter 304 is coupled to 8-bit line driver 305 by data path 307. Data path 307 is four bits wide. Eight-bit line driver 305 is coupled to computer I/O bus 102 by data path 209. Data path 209 is eight bits wide and includes data lines D7–D0. Although the widths of data paths and the identity of certain data lines has been specified above, the present invention may be implemented with data paths of different widths or with different data lines.

Resistor network 302 is coupled to quad A/D converter 304 by line 202. FIG. 3 shows two joystick input devices 105 a and b coupled to interface 103 at J1 and J2 by couplings 104 a and b. However, the present invention also allows a single joystick to be coupled to interface 103 at J1 and J2 left unconnected or at J2 with J1 left unconnected. Also, the capacity of the present invention is not limited to two joystick input devices or other peripherals. Although element 304 is specified as a quad A/D converter and element 305 is specified as an 8-bit line driver, the number of A/D conversion circuits within element 304 and the configuration and/or bit capacity of element 305 could be changed to allow interfacing more than two joystick input devices or other peripherals to the computer.

The analog outputs of joystick input device 105a are coupled to quad A/D converter 304 by coupling 104a. Coupling 104a also couples the digital outputs of joystick input device 105a to 8-bit line driver 305. In addition, coupling 104a couples joystick input device 105a to power supply and ground connections.

The analog outputs of joystick input device 105b are coupled to quad A/D converter 304 by coupling 104b. Coupling 104b also couples the digital outputs of joystick input device 105b to 8-bit line driver 305. In addition, coupling 104b couples joystick input device 105b to power supply and ground connections.

Coupling 104a includes seven lines, two of which are analog outputs from the potentiometers of joystick input device 105a and which indicate the position of the handle of joystick input device 105a, another two of which are digital outputs from the "base" and "stick" pushbutton switches of joystick input device 105a, and three of which are used for power supply and ground connections.

Coupling 104b includes seven lines, two of which are analog outputs from the potentiometers of joystick input device 105b and which indicate the position of the handle of joystick input device 105b, another two of which are digital outputs from the "base" and "stick" pushbutton switches of joystick input device 105b, and three of which are used for power supply and ground connections.

Although the lines included in couplings 104a and b are enumerated and identified specifically, the present invention may be practiced with different lines or a different number of lines. Although the preferred embodiment of the present invention includes only inputs from, not outputs to, an external real-time environment, the present invention may be practiced in a form which includes outputs to the external real-time environment, either with or without inputs from the external real-time environment.

Figure 4:
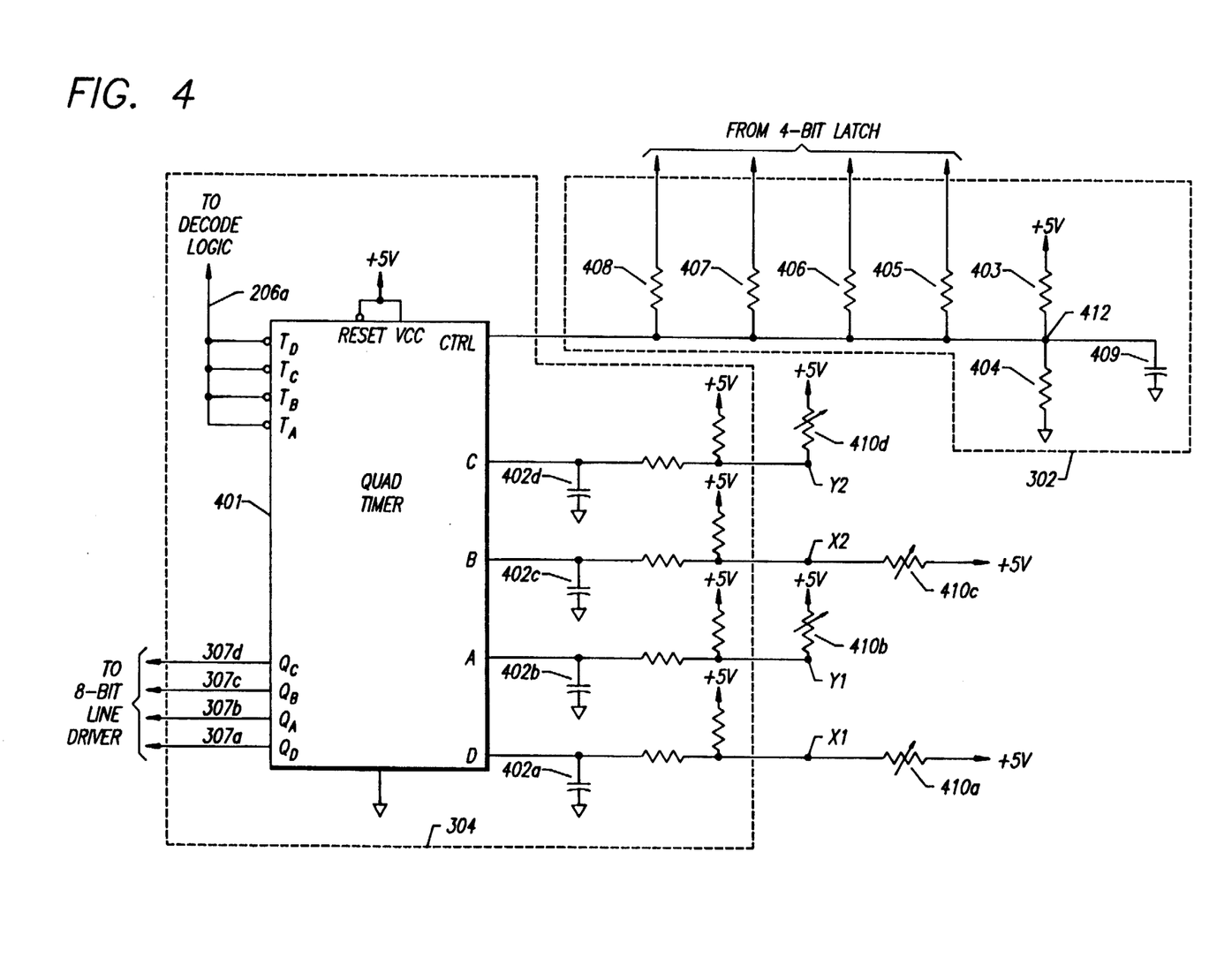
FIG. 4 is a schematic diagram illustrating the joystick potentiometers, the DAC resistor network and the ADC circuitry of the preferred embodiment of the present invention.

FIG. 4 illustrates the joystick potentiometers, the DAC resistor network and the ADC circuitry of the preferred embodiment of the present invention.

An interface which accepts inputs from two joysticks requires four A/D conversion channels, one for the analog signals from each of the two joystick potentiometers in each of the two joysticks.

The DAC resistor network of the preferred embodiment of the present invention includes resistors 403, 404, 405, 406, 407, and 408. Together, resistors 403 and 404 form a voltage divider. The first terminal of resistor 403 is coupled to +5V. The second terminal of resistor 403 is coupled to the first terminal of resistor 404 at node 412, which is the output of the voltage divider. The second terminal of resistor 404 is coupled to the ground voltage. One terminal of each of resistors 405, 406, 407 and 408 is coupled to one of the four outputs of 4-bit latch 301, such that each output is coupled to exactly one of the four resistors 405, 406, 407 and 408. The other terminal of each of resistors 405, 406, 407, and 408 is coupled to node 412. One terminal of capacitor 409 is coupled to node 412 The other terminal of capacitor 409 is coupled to the ground voltage. Node 412 is coupled to the control voltage input of quad pulse generator 401.

The ADC circuitry in the preferred embodiment of the present invention includes quad pulse generator 401 and four timing capacitors 402a–d to provide the required four A/D conversion channels. The four trigger inputs of quad timer 401 are coupled to each other and to enable line 206a from decode logic 204. The four outputs of quad pulse generator 401 are coupled to 8-bit line driver 305.

Elements 410a–d are the joystick potentiometers. The resistance of joystick potentiometers 410a–d depends upon the position of the handles of joystick input devices 105a and b along orthogonal axes. Joystick potentiometer 410a provides the x-axis signal from joystick input device 105a. Joystick potentiometer 410b provides the y-axis signal from joystick input device 105a. Joystick potentiometer 410c provides the x-axis signal from joystick input device 105b. Joystick potentiometer 410d provides the y-axis signal from joystick input device 105b.

The first and second terminals of joystick potentiometers 410a–d are coupled to each other and to the +5 V power supply voltage. The third terminal of joystick potentiometer 410a is coupled to the D-channel input of quad timer 401. The third terminal of joystick potentiometer 410b is coupled to the A-channel input of quad pulse generator 401. The third terminal of joystick potentiometer 410c is coupled to the B-channel input of quad timer 401. The third terminal of joystick potentiometer 410d is coupled to the C-channel input of quad pulse generator 401. Current-limiting and pull-up resistors may be used to couple joystick potentiometers 410a–d to the inputs of quad pulse generator 401.

The first terminal of timing capacitor 402a is coupled to the D-channel input of quad pulse generator 401. The first terminal of timing capacitor 402b is coupled to the A-channel input of quad pulse generator 401. The first terminal of timing capacitor 402c is coupled to the B-channel input of quad pulse generator 401. The first terminal of timing capacitor 402d is coupled to the C-channel input of quad pulse generator 401. The second terminals of timing capacitors 402a–d are coupled to the ground voltage.

The preferred embodiment of the present invention uses decode logic 204 coupled to the address lines of computer I/O bus 102 to decode the I/O address assigned to this interface. Output 205a of this address decoding logic is coupled to the clock input of 4-bit latch 301 (e.g. 74LS175), used to load and retain the adaptation constant. Output 205b is coupled to the output enable connection of 4-bit line driver 303 (e.g. 74LS125) to allow the present adaptation constant to be read by the computer. Output 206a is coupled to the trigger inputs of quad pulse generator 401 (e.g. NE558) to begin the timing operation. Output 206b is coupled to the output enable connections of 8-bit line driver 305 (e.g. 74F244) to allow the computer to test the status of the pulse generator output pulses.

The inputs of 4-bit latch 301 are coupled to the data lines of computer I/O bus 102. The inverting outputs of the 4-bit latch 301 are coupled to both DAC resistor network 302, which determines control voltage input 202 of the pulse generators and to the inputs of 4-bit line driver 303.

DAC resistor network 302 comprises a voltage divider with a 470-ohm resistor 403 connected between +5 V and node 412 and a 3.3K-ohm resistor 404 connected between node 412 and ground, along with additional resistors 405, 406, 407, and 408 connected between the outputs of 4-bit latch 301 and node 412. These additional resistors are of exponentially increasing values; the ratio of their values is 1:2:4:8. The outputs of 4-bit latch 301 can be used to connect or disconnect any combination of resistors 405, 406, 407 and 408 essentially in parallel with resistors 403 or 404 of the voltage divider. Since the sixteen possible combinations of the values 1, 2, 4, and 8 add up to every integer from 0 to 15, the sixteen possible combinations of the outputs of 4-bit latch 301 allow sixteen incrementally increasing resistances to be placed in parallel with resistors 403 or 404 of the voltage divider. These sixteen resistance values allow the voltage divider to output sixteen different voltages at node 412. Node 412 is coupled to control voltage input 202 of quad pulse generator 401. Thus, the control voltage input 202 of quad pulse generator 401 can be programmed to one of 16 voltages. Changing the voltage of the control voltage input 202 alters the charging time of timing capacitors 402a–d, thereby adapting the joystick input to computers of various processing speeds and processor configurations.

To use this embodiment, the software writes the appropriate adaptation constant for the processing speed of the computer to 4-bit latch 301, thereby programming the control voltage of quad pulse generator 401 using DAC resistor network 302. The software then writes to the address location which triggers the operation of quad pulse generator 401. The software then begins measuring the duration of the pulse generator output pulses, reading from the address location which activates 8-bit line driver 305 to couple the pulse generator outputs to the data lines of computer I/O bus 102.

One version of the software, referred to as KTEST, allows user adjustment of the adaptation constants. When running KTEST, the user first places the joystick in its lower right hand corner (thereby maximizing the x- and y-axis resistances). If the program prompts the user to increase the card frequency, then the user presses the up arrow key on the keyboard to increase the card frequency. The user continues to press the up arrow key until the program indicates that proper adaptation has been achieved.

Figure 7:
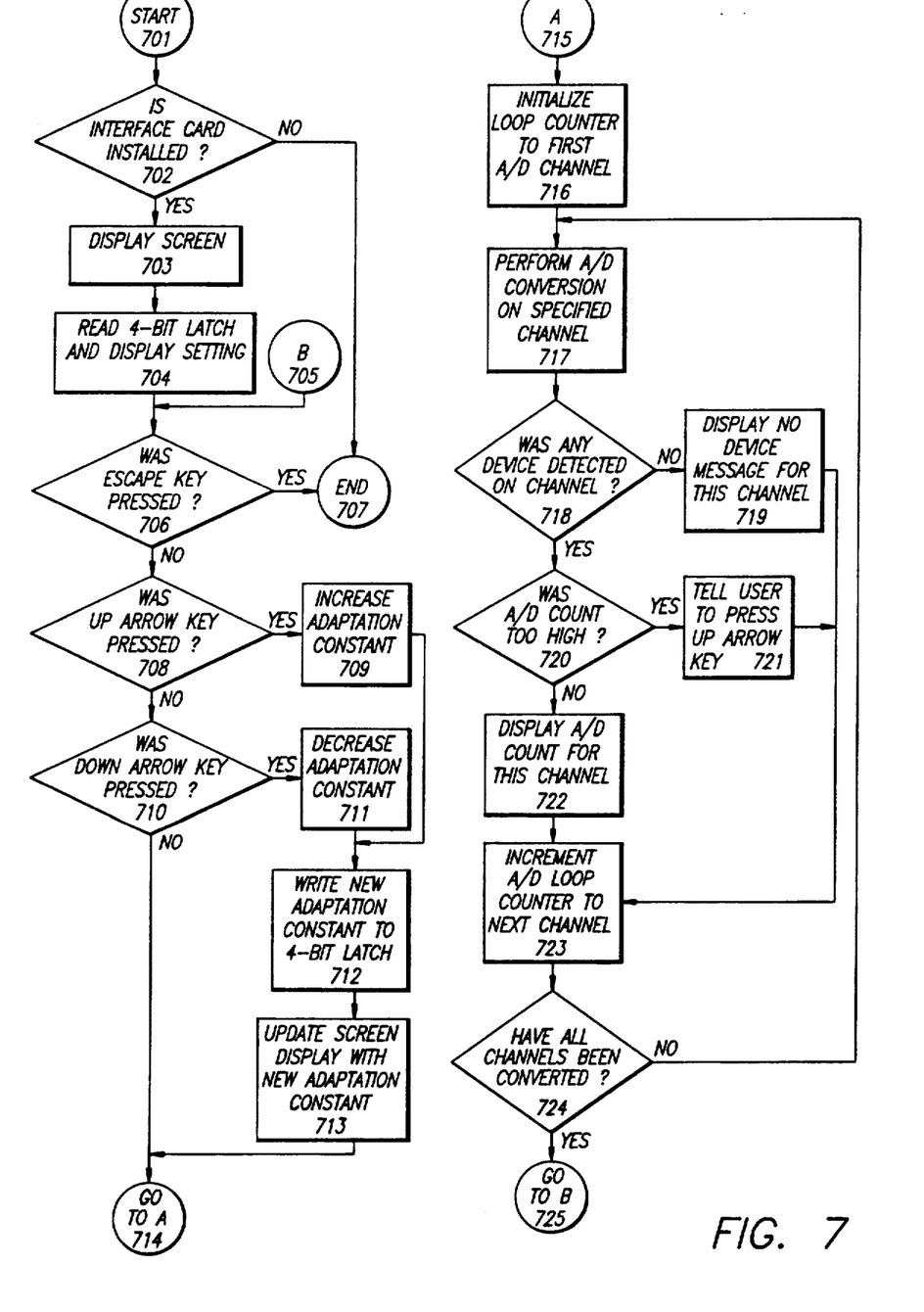
FIG. 7 is a flow chart of the KTEST software.

FIG. 7 is a flow chart describing operation of the KTEST program. KTEST begins in step 701. In step 702, KTEST checks whether the interface card is installed. If not, the program ends immediately in step 707. However, if the interface card is installed, KTEST goes on, in step 703, to display a screen instructing the user to position the joystick in the extreme lower right position, maximizing the x-and y-axis resistances. KTEST then reads 4-bit latch 301 through 4-bit line driver 303 and displays the present value in step 704. KTEST then checks, in step 706, whether the escape key has been pressed. If so, the program ends in step 707. If not, KTEST checks, in step 708, if the up arrow key has been pressed. If not, KTEST checks, in step 710, whether the down arrow key has been pressed. If not, KTEST, in step 714, proceeds to point A on the flow chart.

If the up arrow key was pressed, KTEST first increases, in step 709, the adaptation constant to be stored in 4-bit latch 301, then, in step 712, writes the new adaptation constant to 4-bit latch 301, then, in step 713, updates the screen with the new adaptation constant. After this, in step 714, KTEST proceeds to point A on the flow chart. If the down arrow key was pressed, KTEST first decreases, in step 711, the adaptation constant to be stored in 4-bit latch 301, then, in step 712, writes the new adaptation constant to 4-bit latch 301, then, in step 713, updates the screen with the new adaptation constant. After this, in step 714, KTEST proceeds to point A on the flow chart.

Upon reaching point A in the flow chart in step 715, KTEST initializes the loop counter in step 716 to the first A/D channel, which represents the x axis position of joystick number one. KTEST then performs the analog to digital conversion on that channel in step 717. KTEST then checks, in step 718, to see if a device was detected on that channel. If not, KTEST displays a message, in step 719, indicating that no device is connected to that channel then proceeds to increment the A/D loop counter to the next channel in step 723 and to check whether all channels have been converted in step 724. If a device was detected on the channel in step 718, KTEST checks, in step 720, whether the analog to digital conversion count was higher than the upper count limit. If so, KTEST tells the user to press the up arrow key in step 721, then in step 723, KTEST increments the A/D loop counter to the next channel and, in step 724, checks whether all the channels have been converted. If, however, the A/D count in step 720 was not above the upper count limit, KTEST displays the A/D count for that channel in step 722, increments the A/D loop counter to the next channel in step 723, then checks whether all channels have been converted in step 724. If all channels have been converted, KTEST proceeds to point B on the flow chart in step 725. Otherwise, KTEST returns to perform another analog to digital conversion on the next channel in step 717.

Figure 8:
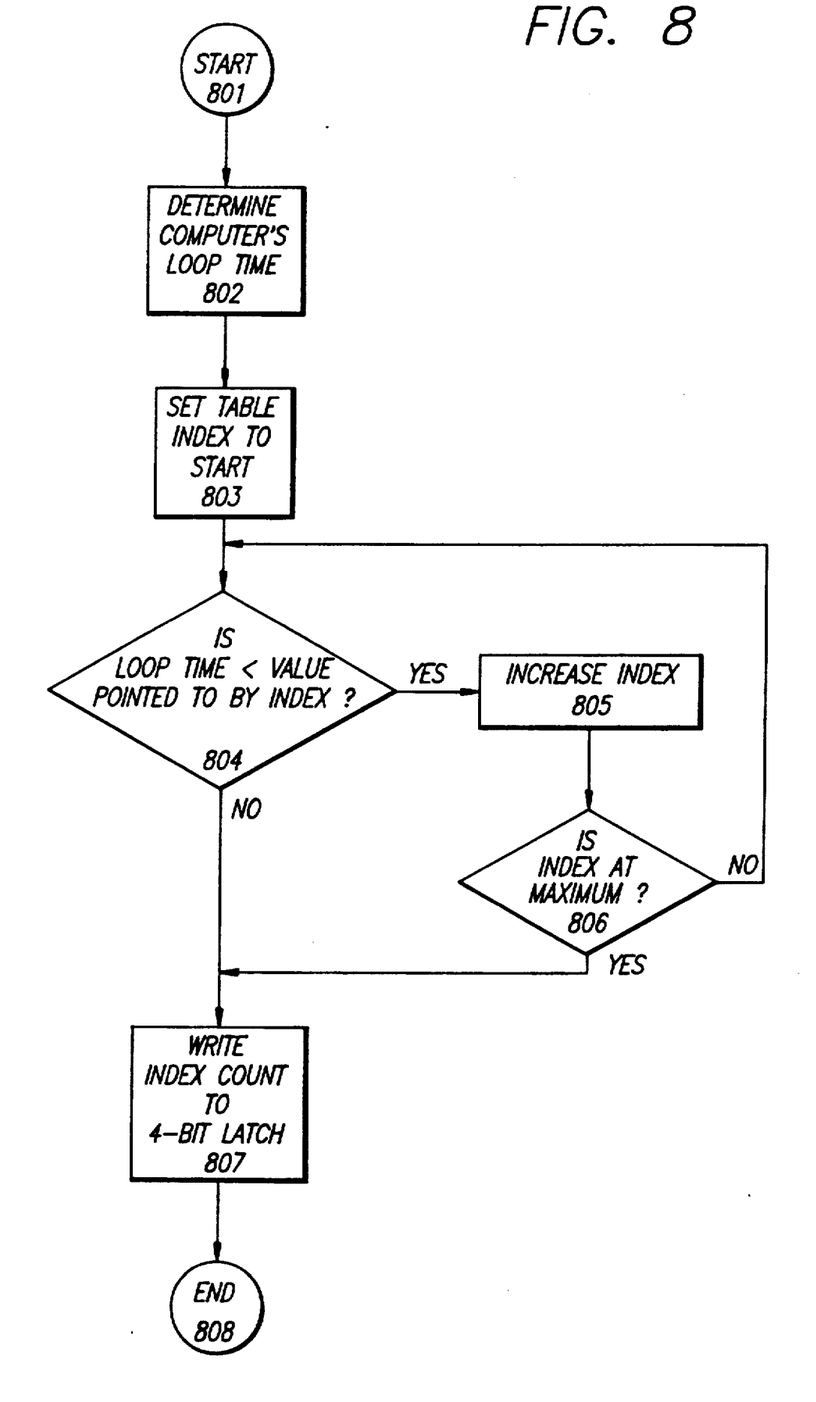
FIG. 8 is a flow chart of the KCARD A software.

Another version of the software, known as KCARD, does not require any user intervention while determining and setting the adaptation constants. The KCARD program is run with the argument "A" for automatic, and is referred to as KCARD A. KCARD A automatically sets the card frequency and displays that frequency to the user. FIG. 8 is a flow chart describing the operation of KCARD A. KCARD A begins in step 801. KCARD A first determines the computer's loop time in step 802, then sets a table index to its starting position in step 803. In step 804, KCARD A compares the loop time to the value pointed to the by index. If the loop time is less than the value pointed to by the index, KCARD A increases the index in step 805 then checks whether the index is at its maximum in step 806. If not, KCARD A returns to once again compare, in step 804, the loop time to the value pointed to by the index. If the loop time is not less than the value pointed to by the index in step 804, or if the index is at its maximum in step 806, KCARD A writes the index count to the 4-bit latch 301 as the new adaptation constant in step 807 and ends the program in step 808.

Another version of the software, referred to as CSOFT, works in a manner similar to KTEST, but requires only that the user press the joystick fire button after positioning the joystick handle in the lower right hand corner, rather than pressing the up and down arrow keys as required by KTEST. At this point, CSOFT operates substantially as loop A of FIG. 7, except adaptation constant is increased or decreased automatically without user participation.

Although three programs, KTEST, KCARD A and CSOFT, have been described, other programs may be used to determine and set the appropriate adaptation constants.

Thus, an interface which can adapt via software the processing speed of computers with various clock rates and processor configurations to the realtime environment in which they operate has been provided.

We claim:

1. A method for converting an analog position signal corresponding to a joystick position into a digital position signal corresponding to said joystick position and useable by a host computer comprising the steps of:
   a. determining a length of time for said host computer to execute instructions;
   b. generating a digital control signal dependent on said length of time;
   c. converting said digital control signal into a control voltage value;
   d. setting an RC circuit discharge voltage equal to said control voltage value;
   e. generating an analog signal proportional to said position of said joystick; and,
   f. charging said RC circuit with said analog signal whereby the RC circuit discharges when its voltage equals its preset discharge voltage to produce said digital position signal, and said digital position signal is at a frequency substantially equal to said length of time.

* * * * *